(12) United States Patent
Swierczek

(10) Patent No.: US 6,941,275 B1
(45) Date of Patent: Sep. 6, 2005

(54) MUSIC IDENTIFICATION SYSTEM

(76) Inventor: Remi Swierczek, Remex 2, 43-150 Bierum, Torowa 27 (PL)

(*) Notice: Subject to any disclaimer, the term of this patent is extended or adjusted under 35 U.S.C. 154(b) by 431 days.

(21) Appl. No.: 09/680,172

(22) Filed: Oct. 5, 2000

Related U.S. Application Data

(60) Provisional application No. 60/186,565, filed on Mar. 2, 2000, and provisional application No. 60/158,087, filed on Oct. 7, 1999.

(51) Int. Cl.$^7$ ............................................. G06F 17/60
(52) U.S. Cl. ..................................................... 705/26
(58) Field of Search ............................. 705/26, 27, 25; 725/93

(56) References Cited

U.S. PATENT DOCUMENTS

| | | | |
|---|---|---|---|
| 4,628,372 A | 12/1986 | Morisawa | |
| 4,870,515 A | 9/1989 | Stokes | |
| 5,038,658 A | 8/1991 | Tsuruta et al. | |
| 5,239,540 A | 8/1993 | Rovira et al. | |
| 5,504,518 A | 4/1996 | Ellis et al. | |
| 5,661,787 A | 8/1997 | Pocock | |
| 5,675,575 A | 10/1997 | Wall, Jr. et al. | |
| 5,739,451 A | 4/1998 | Winksy et al. | |
| 5,765,125 A | 6/1998 | Daugherty et al. | |
| 5,903,892 A | 5/1999 | Hoffert et al. | |
| 5,909,501 A | 6/1999 | Thebaud | |
| 5,910,999 A | 6/1999 | Mukohzaka | |
| 5,918,223 A | 6/1999 | Blum et al. | |
| 5,963,916 A * | 10/1999 | Kaplan | 705/26 |
| 6,314,577 B1 * | 11/2001 | Pocock | 725/93 |
| 6,385,596 B1 * | 5/2002 | Wiser et al. | 705/51 |
| 2002/0023020 A1 * | 2/2002 | Kenyon et al. | 705/26 |
| 2002/0198789 A1 | 12/2002 | Waldman | |

FOREIGN PATENT DOCUMENTS

| | | |
|---|---|---|
| EP | 1 098 460 A2 | 5/2001 |
| KR | 2001010778 A * 7/1999 | H04B/1/40 |

OTHER PUBLICATIONS

"Web Radio," Compressed Air, Washington, Jul./Aug. 1999, Heather Millar.*
"Yahoo to sell downloads," Billboard, New York, Sep. 4, 1999, Catherine Applefeld Olson.*
"Buy That Tune," Kiplinger's Personal Finance Magazine, p. 28, (Sep. 1999).
Copy of Xenote's website, 6 pages, (printed Mar. 2, 2000).
Todd Spangler, "Click! Turning Old Radio Into New Media," ZDNet Inter@ctive Week Online, 3 pages, (Jan. 24, 2000).
Shazam 2580, "http://www.shazam.com/shazam/do/home," 1 page, (Jan. 7, 2003).

* cited by examiner

*Primary Examiner*—Jeffrey A. Smith
*Assistant Examiner*—Matthew S Gart
(74) *Attorney, Agent, or Firm*—Hahn Loeser & Parks, LLP; Robert J. Clark

(57) ABSTRACT

The present invention relates to a music identification/purchasing system, specifically to a method for marking the time and the name of the radio station in portable device such as a key holder, watch, cellular phone, beeper or the like which will allow the user to learn via internet or regular telephone the name of the song, artist and/or music company by matching the stored data with broadcast archive. The system will allow for purchase of the full length of the identified music item or related music. An alternate embodiment provides the listener with convenient means to record a segment of the music in which he/she is interested. The recorded music segment is played back into an apparatus which can identify the song based on the play back and provide the user with information on the identified song such as title, singer or artist, composer, producer, etc., and provide related purchasing information. The user can make selections and provide payment data to the music identification/purchasing system which will result in the selections being delivered to the user by mail.

2 Claims, 3 Drawing Sheets

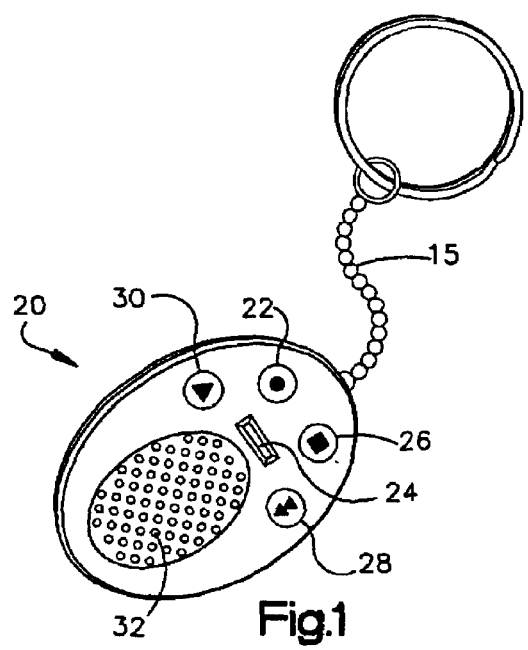
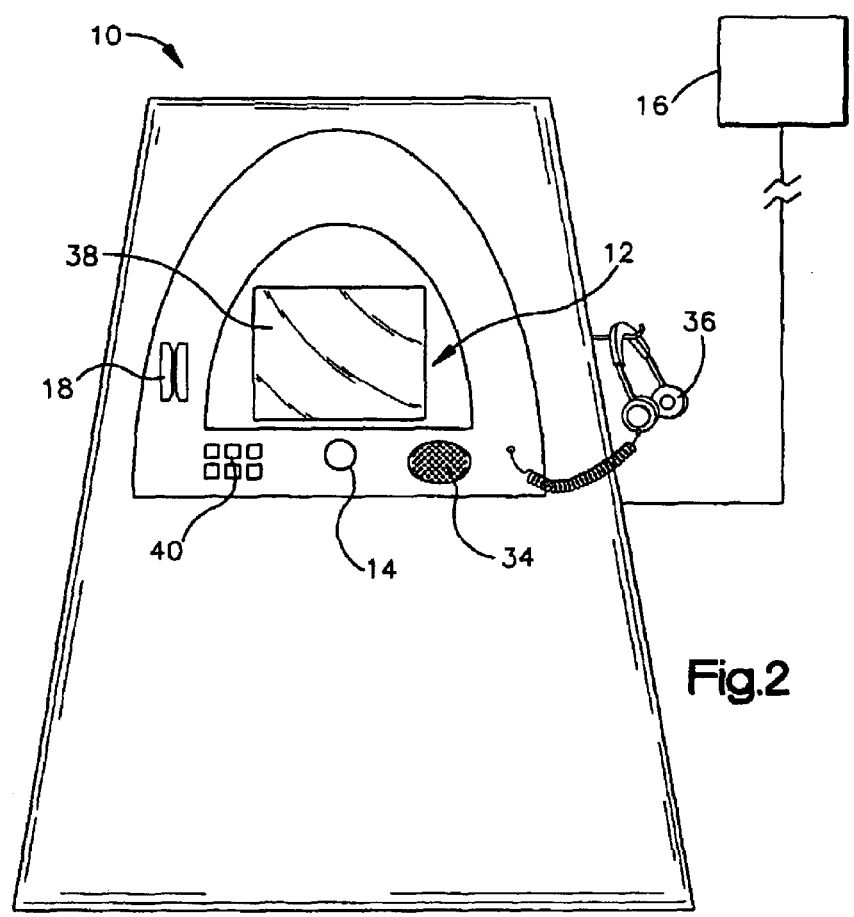

MUSIC IDENTIFICATION SYSTEM

This application claims benefit of Ser. No. 60/158,087 filed Oct. 7, 1999 and Ser. No. 60/186,565 filed Mar. 2, 2000.

FIELD OF THE INVENTION

This invention relates to a music identification system, specifically to a method for marking the time and the name of the radio station in portable device such as a key holder, watch, cellular phone, beeper or the like which will allow the user to learn via internet or regular telephone the name of the song, artist and/or music company by matching the stored data with broadcast archive. The system will allow for purchase of identified segment.

BACKGROUND OF THE INVENTION

Often a person hears a song, or part of a song that they would like to buy but they are unfamiliar with the name of the song or the singer. The music could be on a car radio or any other places where you might hear music. Even if you had the means to copy a segment of the music, you would still need to find someone familiar with the song to enable you to find and purchase the recording. With the number of musical recordings available, this could be an impossible task unless the song is known or popular. More often than not, the song is forgotten and perhaps never heard again. This represents lost sales to the recording industry and lost entertainment to the potential customer. As such, there is a need for a system allowing a person to learn who and what was playing on a given radio station at a specific time.

SUMMARY OF INVENTION

An object of this invention is to provide the listener with convenient means to record the name of radio station and time when the wanted music was played. Another object of this invention is a system that receives the recorded data via phone or internet modem and searches the radio station archives to inform the listener regarding the name of the artist, album or producer.

Another object of the present invention is an apparatus or system that can provide purchasing information and allow the user to directly order the item.

Another object of this invention is to provide the listener with convenient means to record a segment of the music in which he/she is interested.

Another object of this invention is a system where the recorded music segment is played back into an apparatus which can identify the song based on the play back and provide the user with information on the identified song such as title, singer or artist, composer, producer, etc.

These along with other objects and advantages of the present invention will become more readily apparent from a reading of the detailed description taken in conjunction with the drawings and the claims.

BRIEF DESCRIPTION OF THE DRAWINGS

FIG. 1 shows a flow chart of one embodiment of the music identification method of the present invention;

FIG. 2 shows a top perspective view of a keychain recording device according to an embodiment of the present invention;

DESCRIPTION OF PREFERRED EMBODIMENTS

Figure 5:
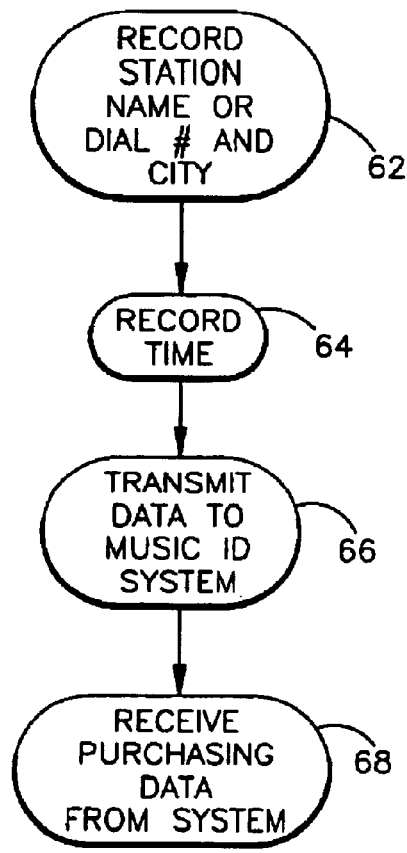
FIG. 5 shows a flow chart of the music identification process of another embodiment of the present invention.
Figure 6:
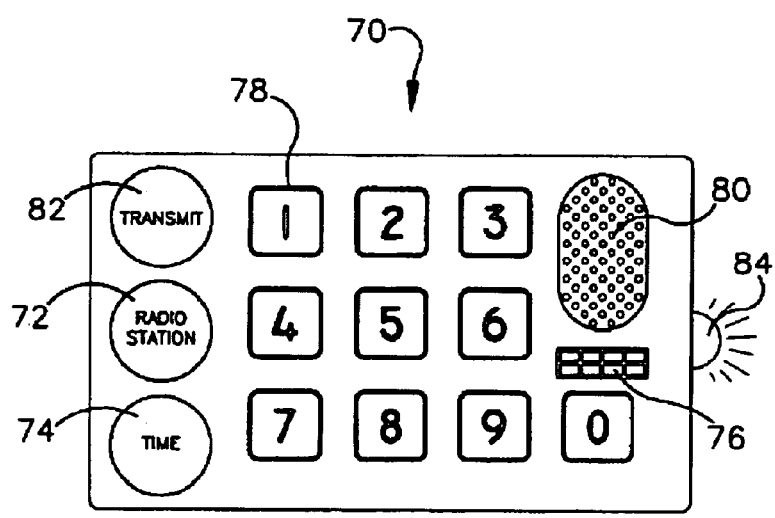
FIG. 6 shows a top perspective view of a recording device according to an embodiment of the present invention.

Embodiments of the present invention are explained in detail hereunder referring to the drawings. In one embodiment, the recording device will be a key chain (similar to the one shown in FIG. 1), a watch, a cellular telephone, a beeper or a like device allowing for verbal recording. Referring now to the flowchart depicted in FIG. 5 and the recording device of FIG. 6, the recording device 70 is used by pressing a button 72 to record the name of the radio station in a simple word 62 and then pressing a button 74 that will record actual time of recording or optionally the time can be verbally recorded by the user 64 using microphone 76, for example, "w w d k nine one point seven Cleveland" or "nine nine point four Pittsburgh". Recording in simple words describing the numbers, letters, and city names will allow for standard computer recognition of transferred data into the system.

In another embodiment, the recording device 70 will have a telephone like key pad 78 (not required for the cellular telephone) allowing the user to enter in to the memory numbers identifying the radio station and the numeral city code 62.

In both cases, the device would have a telephone beeper or speaker 80 allowing for simpler data transfer 66 into the processing system (no modem or access to the computer required). The user can lift a telephone receiver and press send or transmit button 82 to automatically dial the proper 800# (or 888#), user ID number, and recorded station information.

The feedback 68 allowing for purchase of wanted and unknown music would arrive to the user via e-mail or through regular mail via an automatically generated and printed post card.

In another embodiment, new digital radio manufacturers would provide for a "signal port" 84 on the face of the radio receiver (mechanical electronic connector or infrared port). This would allow for digital recording of the sample of played music by plugging the device into the port or by infrared data transfer holding the device near the port.

In this case, automatic matching with digital music files would allow for recognition of wanted music without access into the radio station archives. The drawback would be a requirement to transfer the samples digitally via modem.

Referring now to FIG. 1, a flow chart shows the method of the present invention comprising the steps of recording a music segment 50, transmitting a playback of the recorded music segment into a microphone 52, identifying the recorded music segment 54, reporting information related to the identified music segment 56, providing options 58 to obtain additional related information or to obtain an identification of another recorded music segment, and providing purchasing information 60 including the means to direct order the selected musical works. The steps are described in detail below.

Referring now to FIG. 2, a recording device 20 is shown attached to a keychain 15. The recording device 20 can be either digital or analog. The recording device 20 can be of any known type or configuration, which is convenient to store on a person, in a pocket or purse such. With the continuing miniaturization of chips, the recording device 20 could easily be configured as a credit card or any other configuration, which is typically carried by a person on a continuous basis. When a song that the user wants identified is playing, the user need only press the record button 22 on device 20 and hold the microphone 24 of the device near the source of the music. When a sufficient segment is recorded 50, the user presses the stop button 26 to end the recording. The song can be replayed by pressing the back (digital) or rewind (analog) button 28 and then pressing the play button 30 and listening to the speaker 32. Any device capable of recording and playing back a music segment would be acceptable for use with the present invention.

Figure 3:
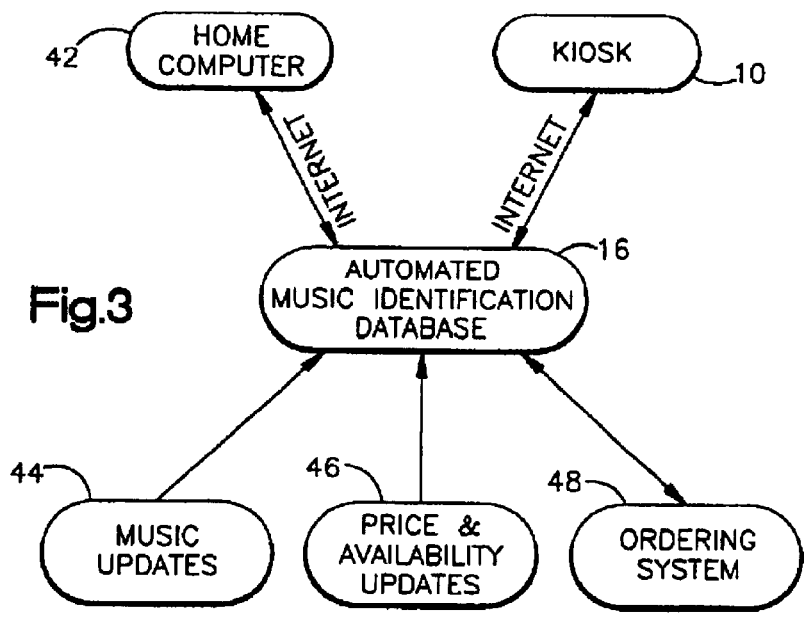
FIG. 3 shows a perspective view of a kiosk computer system according to an embodiment of the present invention.
Figure 4:
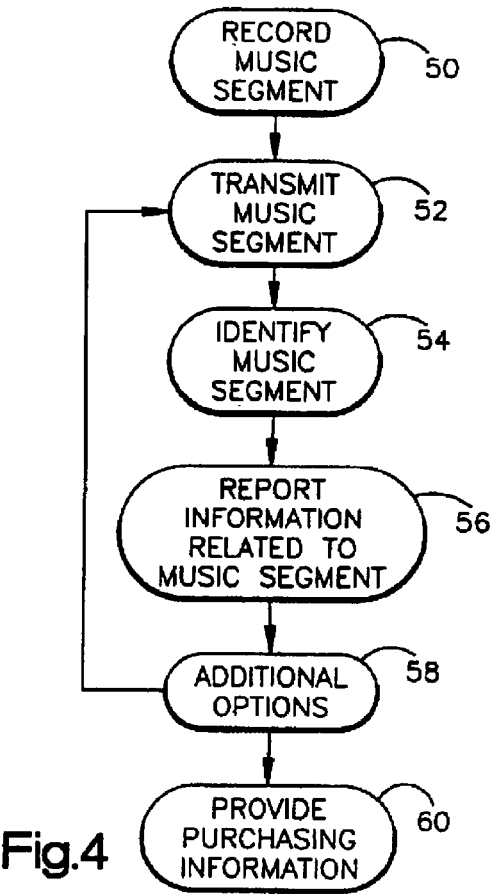
FIG. 4 shows a flow chart of the computer identification process of an embodiment of the present invention.

Referring now to FIG. 3, once a segment of music has been recorded 50, the listener can go to a computer or music identification kiosk 10 having a computer interface 12 and replay or transmit the music 52 into a microphone 14 of the interface. In one embodiment, the interface 12 is connected to an automated database 16 over the Internet. The automated database 16 uses a central processing unit and search stored information as known in the art to analyze the music segment and compare it to stored works until a match, matches or near matches are found and the music segment is identified 54. One such system is disclosed in U.S. Pat. No. 5,918,223 although other systems and searchable audio databases as are known in the art may be used. It is important to note that the identification step 54 performed by the automated database 16 could just as easily be one or more music "experts" or disc jockeys seated in a room that listen to the recorded music segment and identify the song based on their memory and knowledge of music. Once the music segment is identified 54, the information related to the song, i.e. title, artist, etc., could be supplied to the customer 56 directly or entered into the automated database where the information, and any specified related information is supplied to the customer 56.

It is also contemplated that the user can access the automated database 16 directly over the telephone. The user would call a specified number and follow instructions provided by the automated database 16. When prompted, the user can playback the music segment 52 into the telephone microphone. The automated database 16 would then identify the music segment and report the results back over the telephone 56. The telephone access to the automated database is configured to allow additional related information and options 58 to be accessed, including ordering information 60, just as with the other embodiments.

Often, the quality of the recorded music segment may be poor as the recorder may also record background noise from other sources such as the car engine, noise from other cars, people talking, etc. The automated database system 16 includes noise reduction filters (not shown) as known in the art, to filter out any background noise in the recording which may inhibit the system from finding a match. In one embodiment, the automated database 16 will search and identify at least one characteristic of the song, such as the melody, and retrieve all songs which match the particular identified characteristic. The search would thus retrieve a song or melody produced by various artists or different recordings produced by the same artist at different times. However, it is contemplated that the database 16 is capable of recognizing specific artists. The database 16 can provide the user with information on the identified song such as title, singer or artist, composer, producer, etc. which can be browsed or selected from a video monitor screen 38 using either a touch-screen or control buttons 40. It is contemplated that in addition to the song from the music segment, the user will have additional options 58 such as, but not limited to, the ability to search for other works by the same artist, or the same song by different artists and be able to play portions of these works on a selectable basis through a speaker 34 or attached headphones 36. The user also has the option 58 of transmitting an additional music segment 52 to be identified 54. In certain embodiments, the automated database 16 may also provide the cost and/or location of the identified or selected music for purchase 60. If preferred, the user can order the selection through an ordering system 48 of the automated database 16 and pay by conventional means such as swiping a valid credit card through a scanner 18 attached to the computer interface 12. The database 16 may also provide the user with an additional music segment to confirm the identity of the segment initially supplied by the user.

It is contemplated that the automated database 16 can exist as a stand-alone unit within the music identification kiosk 10 either such that the database would be located on site or at a centralized computer located off-site. The automated database 16 would be updated on a periodic basis to include newly released music 44 and the latest price and availability 46. All new music would have a digital code in the background to allow for simple recognition software as is known in the art.

In a typical scenario, the kiosk 10 would be located in a retail store. Potential customers wanting to identify a music segment would be able to use the kiosk 10 to identify the music segment and locate the music within the store.

It will also be possible to directly access the automated database 16 directly from a personal home computer 42 over the Internet.

What is claimed is:

1. A process of identifying music comprising:
   a) providing a portable communication device to be used by a consumer;
   b) a service provider providing a music identification device having a database of prerecorded musical works;
   c) the consumer recording a segment of music that is audible to the consumer in a location remote from the music identification device using said portable communication device;
   d) the consumer transmitting said recorded musical segment from said portable communication device into a central processing unit of the music identification device;
   e) the music identification device analyzing and comparing said musical segment to the database of musical works;
   f) the music identification device identifying at least one closest match;
   g) the music identification device generating database information regarding said at least one closest match; and
   h) the music identification device transmitting the database information regarding said at least one closest match to the consumer.

2. A method for purchasing a music item comprising the following steps:
   a) providing a portable communication device to be used by a consumer that is listening to a source of audible music;

b) a service provider providing a remotely located music identification/purchasing system having a database of prerecorded musical works;
c) the consumer directing a microphone of the portable communication device toward the source of audible music;
d) the consumer activating the portable communication device to transmit a segment of the audible music to the remotely located music identification/purchasing system;
e) the music identification/purchasing system automatically entering said transmitted segment of music into a central processing unit of said music identification/purchasing system;
f) the music identification/purchasing system automatically analyzing and comparing said transmitted segment of music to music contained in a music database; and
g) the music identification/purchasing system automatically identifying a music selection providing the closest match from music contained in the music database to said transmitted segment of music;
h) the consumer receiving purchasing information from said music identification/purchasing system related to the music selection providing the closest match;
i) the consumer transmitting at least one music item selection and payment information to said music identification/purchasing system; and
j) the consumer receiving said music item selection.

* * * * *